June 11, 1940.  M. SCHMIDT ET AL  2,204,385

SELF-LOCKING NUT

Filed Sept. 29, 1938

Inventors:
Martin Schmidt
Karl Gmöhling
by Walter S. Bleistein
ATTORNEY

Patented June 11, 1940

2,204,385

UNITED STATES PATENT OFFICE 2,204,385

SELF-LOCKING NUT

Martin Schmidt, Weende, near Gottingen, and Karl Gmöhling, Gottingen, Germany

Application September 29, 1938, Serial No. 232,382
In Germany September 29, 1937

4 Claims. (Cl. 151—7)

The present invention relates to self-locking nuts of the type which are to be secured to a metal sheet or other part by rivets, screws, welding or the like.

Nuts having a flange or lug which permit securing of the nut at one end to metal sheets by rivets, screws or welding are already known. It is further known to make such nuts self-locking by placing a ring of a resilient material such as a fibre ring, into an internal annular groove in the nut.

In the known nuts for riveting on, of which the locking element consists of an inserted fibre ring, this ring is usually located at that end of the thread of the nut which is remote from that end of the nut which is to be secured to the metal sheet. However, because the bolt must always be screwed into that end of the nut at which it first receives guidance in the thread of the nut and in order then to enable the bolt to cut into the locking fibre ring at the other end of the nut, the self-locking riveting nuts serving as foot bearings for bolts have hitherto always been fitted on the side of the sheet opposed to the bolt. The sheet must therefore have a sufficiently wide perforation to enable the bolt to pass through before it can be screwed into the nut seated on the other side.

The purpose of the invention is to construct a self-locking nut which is to be secured at one end to a sheet or the like and in which the resilient insert serving as the locking element for the bolt is disposed near the securing end of the nut. According to the invention, this is achieved by forming the nut of two concentric parts which are connected with each other so as to be incapable of rotation and which permit installation of the locking element also at the securing end of the nut. The nut constructed according to the invention thus consists of a casing-shaped part equipped with a securing flange or the like, which part receives the other part which bears the thread of the nut. The latter is manufactured separately and is mounted in the casing-shaped part so as to be incapable of rotation.

By means of this two-part construction of the nut manufacture and store keeping are simplified. For nuts of a certain size it is only necessary to manufacture one kind of the casing part provided with flanges, into which parts threaded bushes of any desired special construction, for instance with different kinds of threads and with different locking inserts can be placed, whereby it is merely necessary to fulfill the requirement that the outer form of the various inner parts correspond to the inner form of the casing part. Moreover, the two-part construction permits the fibre ring serving as the locking element to be installed now without difficulty at the securing end of the nut. The locking element is preferably secured directly at the end of the thread-carrying inner part of the nut. By bending in the rim of the casing-shaped part of the nut, the inner part is firmly encased. In a special construction of the invention, the part of the nut carrying the thread is reduced at its end corresponding to the thickness of the inwardly bent rim of the outer part of the nut.

The self-locking nuts constructed according to the invention are useful as foot bearings for bolts on the same side of the sheet on which the bolt is located. The bolt can readily be screwed into the free head end of the nut until finally it cuts into the fibre ring located on the securing side of the nut. A perforation in the sheet for the passage of the bolt is no longer necessary. Also, a saving is effected in the length of the bolt and thus in weight.

The invention is more particularly described with reference to the accompanying drawing, in which.

Figure 1:
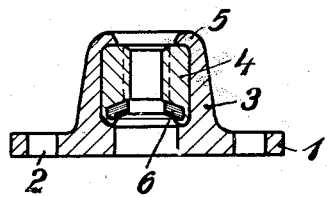
Figure 1 shows a ready assembled nut in section.
Figure 5:
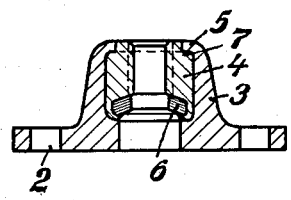
Figures 5–8 are views corresponding to Figures 1–4 showing a second form of construction.
Figure 2:
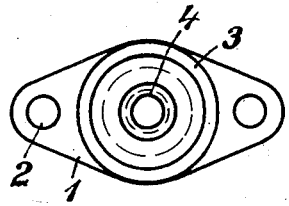
Figure 2 shows the same nut in plan view.
Figure 6:
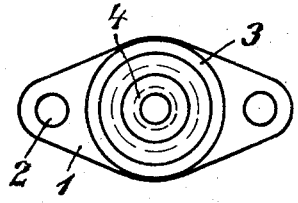
Figure 3:
Figures 3 and 3a show the separately manufactured inner part of the nut, which part carries the thread and the fibre ring, in side elevation and in plan view respectively.
Figure 7:
Figure 3A:
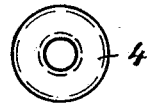
Figure 7A:
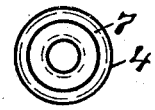
Figure 4:
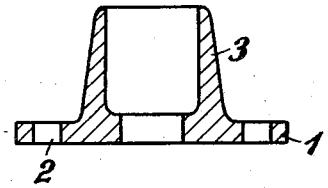
Figure 4 is a section through the outer part of the nut, which part serves as the receiving casing and has the securing flange.
Figure 8:
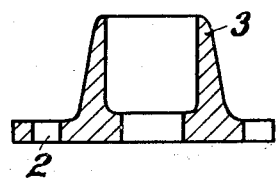

The securing flange 1, which is provided with rivet holes 2, is integral with the casing 3 and forms the outer part of the nut for riveting on. The casing 3 can be of cylindrical, conical, prismatic or any other suitable form. The inner part 4 of the nut, which part carries the thread, is produced separately and after introduction into the casing 3 is firmly enclosed by bending over the rim 5 of the casing. Rotation of the inner part 4 relative to the casing 3 can be prevented, for instance, by the ribbing of the outer surface visible from Figure 3 or by any other suitable means such as non-circular or prismatic shape. The part 4 of the nut carrying the thread has an inserted fibre ring 6 which ensures automatic locking of the bolt, which is to be screwed in from the head side of the nut.

The construction according to Figs. 5 to 8 differs from that according to Figs. 1-4, in that the inner part 4 of the nut has an annular shoulder 7 of such dimensions that the upper rim 5 of the casing part 3, which rim is bent inwardly on the enclosing step, bears on this shoulder in such a way that it runs flush with the top surface of the inner part 4 of the nut.

The securing of the inner part of the nut in the casing-shaped part provided with the securing flange can also be effected in any other desired manner, e. g. by dissemination, provision of pins, etc.

We claim:

1. A self-locking nut for fastening a screw stud to a non-apertured sheet metal member, comprising an outer casing having at least one lateral projection of its bottom portion adapted to be secured to said sheet metal member, a female threaded member within said casing, said casing having an aperture in its top, coaxial with said threaded member, and a locking insert of a resilient material, said insert being secured next to the lower portion of said female member, said female member and said casing embodying means for preventing rotation relatively to each other.

2. A self-locking nut for fastening a screw stud to a non-apertured sheet metal member, comprising an outer casing having at least one lateral projection of its bottom portion, adapted to be secured to said sheet metal member, a female threaded member within said casing, said casing having an aperture in its top, coaxial with said threaded member, and a locking insert of a resilient material, said insert being located between the base end of said female member, and the bottom of said casing, said female member and said insert embodying means for preventing rotation of the parts relatively to each other.

3. A self-locking nut for fastening a screw stud to a non-apertured sheet metal member, comprising a cup-like member having at least one lateral projection of its bottom portion, adapted to be secured to said sheet metal member, a female threaded member within said cup-like member, and a locking insert of a resilient material at the base end of said female member, the upper rim of said cup-like member being bent over so as to hold said female member and said insert within said cup-like member, and said cup-like member and said female member embodying means for preventing rotation relatively to each other.

4. A self-locking nut for fastening a screw stud to a non-apertured sheet metal member, comprising a cup-like member having at least one lateral projection of its bottom portion, adapted to be secured to said sheet metal member, a female threaded member within said cup-like member, and a locking insert of a resilient material at the base end of said female member, the female member having a peripherally off-set upper portion, the upper rim of said cup-like member being bent over so as to engage said off-set portion and to hold said female member and said insert within said cup-like member, and said cup-like member and said female member embodying means for preventing rotation relatively to each other.

MARTIN SCHMIDT.
KARL GMÖHLING.